United States Statutory Invention Registration [19]

[11] Reg. Number: H381

Pounds et al. [43] Published: Dec. 1, 1987

[54] CONDITION MONITORING DEVICE

[75] Inventors: Stanley G. Pounds, Budd Lake; Daniel Ramer, Kinnelon, both of N.J.

[73] Assignee: The United States of America as represented by the Secretary of the Army, Washington, D.C.

[21] Appl. No.: 942,555

[22] Filed: Dec. 16, 1986

[51] Int. Cl.[4] ..... G01K 1/14; G01K 13/00; G01L 5/14

[52] U.S. Cl. ..... 374/142; 73/167; 73/336

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A multiple sensor condition monitoring device for use with an enclosed container. The device includes a plurality of passive sensors positioned within the container and adapted to measure temperature, pressure and relative humidity within the container. Meter means are connected to the sensors for operating the sensors and receiving measurements from them. Finally, means for enabling the calculation of the specific quantity of moisture in the container using the measurements from other sensors is provided.

11 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONDITION MONITORING DEVICE

GOVERNMENTAL INTEREST

The invention described herein may be made, used, or licensed by the Government for Governmental purposes, without the payment to me of any royalties thereon, or therefor.

BACKGROUND OF THE INVENTION

Field of the Invention

The invention relates to apparatus used to monitor the environmental conditions inside sealed containers, and more particularly to monitor the conditions in containers such as projectiles which contain energetic materials.

Energetic materials such as explosives and propellants are particularly susceptible to change when subjected to variations in the amount of water present inside the projectile or other container. Depending upon the nature of the energetic material, an increase of water content can retard or enhance the likelihood of detonation at the time of use, and can even cause premature detonation; and a decrease of water through absorption or leakage of moisture can have similar deleterious effects on other energetic material. Some explosives and propellants self-detonate when the amount of water or water vapor is changed, so as to initiate or retard reactions that are effected by moisture.

Heretofore, efforts have been made to monitor the conditions of containers as the container is exposed to potential changes in moisture content. Other than by the very undesirable option of opening the container and physically inspecting it periodically, with the attendant costs and opportunity for moisture contamination, no effective way has yet been developed to accomplish such effective monitoring. Statistically based sampling of some of a large number of similar containers, such as stockpiled projectiles and the like, can statistically monitor a large sampling. This method is expensive, however, as destructive testing is the only reliable method presently available to evaluate the condition of the energetic material inside the container. This method, moreover, is time-limited, as well as being number limited by the quantity of samples which must be distructively used for periodic testing. Eventually, the sample becomes a major portion of the total lot size. Moreover, unexpected changes in environment will cause additional testing to be required, thus further shortening the total reliable sampling time. Proper test equipment such as a firing range may not be readily accessible to the principal storage place of the product, thus raising further inadequacies or inaccuracies due to required transportation of the samples.

Other proposals to monitor containers which are exposed to changes in conditions are also not effective in providing complete lot reliability as to the effect of such changes. For example, when temperature can be monitored externally and that data used to calculate the pressure based upon the amount of moisture originally in the container, there is no way to determine if absorption of the moisture or chemical reaction to produce additional moisture has taken place. Thus, the measurement is somewhat meaningless. Even when reliable relative humidity data is obtained from within a container, such as by calculation or measurement, changes in absolute quantities of moisture cannot be ascertained.

Accordingly, it would be of a great advantage to the art if a multiple sensor condition monitoring device could be provided for use with an enclosed container which would provide a way of determining the absolute amount of moisture within a container. It would be valuable if such a device could be provided which would permit monitoring of the conditions in the container so as to determine accurately when any change in the conditions inside the container take place which cause a change in the amount of water present in the interior.

SUMMARY OF THE INVENTION

It has now been discovered that the amount of moisture in a sealed container such as containers containing energetic material may be monitored by the device of this invention. The device comprises a multiple sensor conditioning monitoring device for use in an enclosed container. Contained within the sealed container is a plurality of passive sensors positioned therein and adapted to respectively measure temperature, pressure and relative humidity within the container. A meter means is provided with contact to the sensors for operating the sensors and receiving measurements therefrom. Means for enabling the calculation of the specific quantity of moisture in the container using these measurements is also provided. In those instances when the container is metallic, the sensor may be connected to the meter by means of direct contact. When the container is a non-metallic projectile or other container, the sensors may be connected by induction means. The meter means and means for calculation of the specific quantity of moisture in the container will often include a gauge means for displaying measured values of temperature, pressure and relative humidity. The values which are displayed may also be recorded in a recording means for permanent or temporary storage. Means for displaying the calculated value of moisture in the container may be provided as well as means for recording the calculated value of the moisture in the container.

The amount of moisture is calculated using the measurements from the sensors. This calculation may be done by the operator or by use of an electronic device programmed to make the calculation given of the data produced by the present invention.

BRIEF DESCRIPTION OF THE DRAWINGS

The foregoing embodiments of this invention and the particular features of the various alternative embodiments will be more clearly understood from the following detailed description thereof, which is read in conjunction with the accompanying drawings, in which.

DETAILED DESCRIPTION OF THE INVENTION

As has been referenced above, the present invention relates to the use of miniature sensors placed in containers so as to measure pressure, temperature and relative humidity. Many state-of-the-art sensors are available and may be used in the present invention. It is important that the sensors be small enough so that they may be placed in the container without adversely affecting either the volume or the weight of the projectile or other container. The sensors are passive and are connected to a meter, and are then energized through the container so as to preserve the integrity of the interior of the container, particularly when the container contains an energetic material.

The pressure sensor may be any of the miniature passive pressure sensing or measuring devices currently available commercially, such as those which employ a pressure sensitive crystal. Miniature temperature sensors are also available commercially, such as those which measure a change in resistance with respect to temperature. Likewise, relative humidity sensors are commercially available which operate using capacitor changes with respect to wet and dry bulb effects.

Connection of the sensor to the meter and thus the power source is done in different ways, depending on the nature of the container. Sensors may be wired to the meter, either permanently or preferably detachably. An induction connection is preferred. When the conductivity or magnetic permeability of the container wall does not permit inductive coupling through its structure, then hermetic connectors bonded to the container wall are necessary. The hermetic bonding ensures that the presence of the connector does not breach the seal of the container nor does it detract from the structural integrity of the container, especially when explosive or propellant materials are contained therein.

The data is generated from the sensors by activation of the sensor from a power source which is normally part of the device. The meter device is preferably connected to a power source and has control means or switches for activating each of the sensors. A display means may be provided for displaying the individual readings, in sequence or upon demand by an operator. When the moisture content of a container attached to the meter is to be measured, values for pressure, temperature and relative humidity can be read, such as from a digital display means or other form of read-out. Alternatively, a recorder may be operably connected to the meter to record the data obtained from these sensors. Calculation of the moisture content can then be done by the operator. In a preferred embodiment, the meter device may include a circuit for calculating the amount of moisture from the most recent reading from each sensor. The results of this calculation may then be optionally displayed on the display means or recorded on a recorder.

Figure 1:
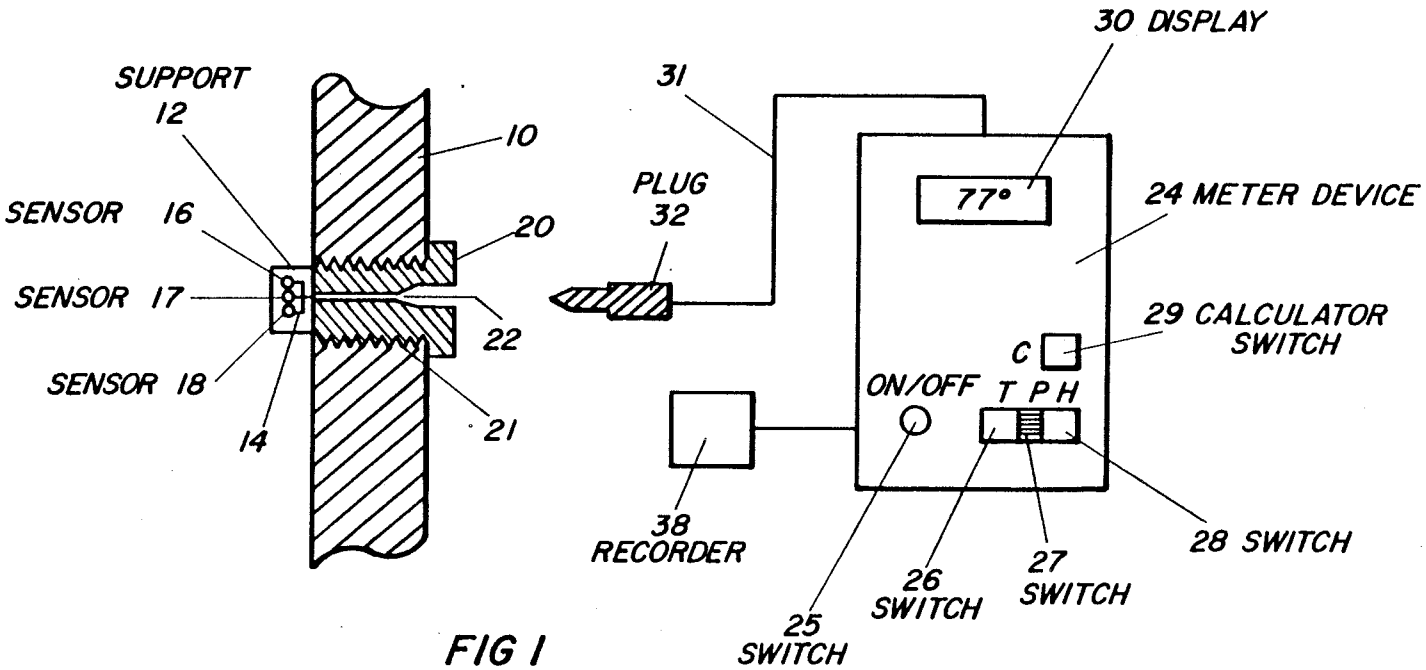
FIG. 1 is a schematic, partially sectioned view showing one preferred embodiment of the present invention.

As shown in FIG. 1, a wall of a container 10, which in this instance retards inductive transmission, is fitted on the inside with a support 12 which holds a connecting wire 14 and a temperature sensor 16, pressure sensor 17, and relative humidity sensor 18. Connected to the sensor wiring is a plug 20 threaded into the container wall 11 with threads 21. Electrical contact 22 thus completes the contact to the outside through plug 20.

A meter device 24 is provided with an on/off switch 25 and activation switches for temperature 26, pressure 27, and relative humidity 28. Activation of each of these switches 26, 27 and 28 will supply power from the meter 24 through line 31 into connector plug 32 which has been fitted into plug 20. Connector plug 32 connects into plug 20 and makes electrical contact through the contact 22 and wire 14 into the particular sensor 16, 17 or 18 depending upon the control switch on meter 24. The results of the data retrieved from the sensor is displayed in display 30. For example, if switch 26 is activated to determine the temperatures from sensor 16, the temperature in the interior may be reflected in display 30 as shown.

In the preferred embodiment, the inductive coupling device provides the means to transmit data derived from the sensors through the hermetic wall. A measurement inquiry is activated when the meter inductively transmits a pulse from an external inductor to an internal inductor associated with circuitry within the container. The internal electronic subsystem responds to the inquiry pulse by generating answer pulses and transmitting them inductively to the meter. The internal electronic subsystem delays the response pulses based on the sensors' measured values of internal conditions. The meter measures the delays and converts the times to measurements of the internal conditions.

In some instances, the meter means 24 is provided with an electronic circuit for calculating the amount of moisture from the most recent values of pressure, temperature and relative humidity. For each particular container 10, the volume is known and that information can also be provided to the circuit. Calculator switch 29 is provided to activate the circuit and calculate the amount of moisture. If such a calculation is done manually, by the operator, activation of switches 26, 27 and 28 provide the same information.

In another embodiment, a recorder 38 is provided which may continuously record all of the data which is collected by the meter 24. Alternatively, only that data which is displayed in display means may be recorded, depending upon the needs of the particular monitoring program.

Figure 2:
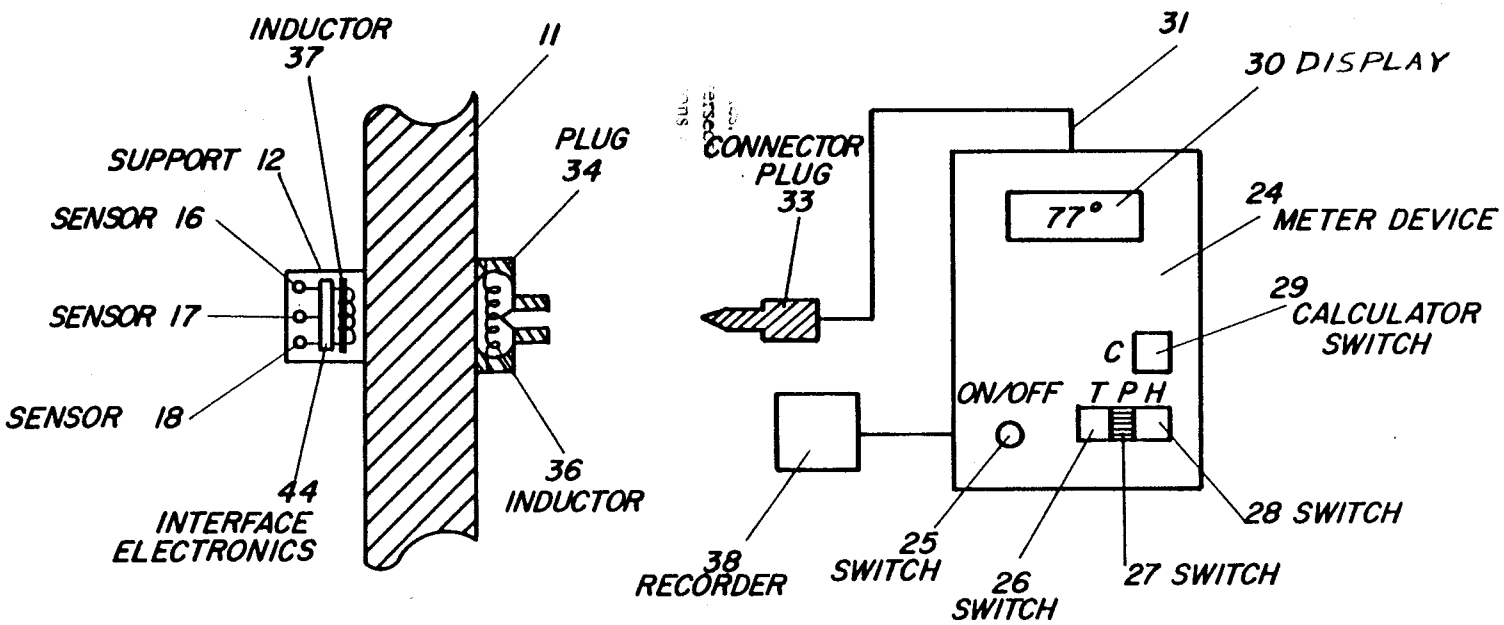
FIG. 2 is a schematic, partially sectioned view of a second preferred embodiment of the present invention.

As shown in FIG. 2, a similar set of sensors and meter means are provided. The difference is that the container wall 11 does not inhibit inductive coupling so that the sensors 16, 17 and 18 are connected indirectly through interface electronics 44 to an inductor 37. Similarly, plug 34 operates with connector plug 33 to energize the inductor 36 and energize sensors 16, 17 and 18 and return the produced data through line 31 to the meter means 24.

Operation of the device is the same as described with respect to the embodiment shown in FIG. 1.

Because of the versatility which may be achieved using the present invention, where a plug may be installed on a statistically valid number of identical projectiles, tests can be performed without destruction of any of the sampling, thus requiring a significantly fewer number to monitor over an indefinite period of time. The monitoring device can be brought to stock piles of containers, thereby bringing economy in use which would more than offset the cost of modifying a statistically valid number of containers.

In the case of projectiles, another advantage occurs in that the samples may be subjected to jolt, tumble, and drop tests. If an indication of damage or danger is readily determined from use of the monitoring device after such tests, the dangerous condition will be known and the projectile, if that is being tested, can be fired or otherwise disposed of.

Although it is not shown, it is clear that an electrical manifold may be created so that one meter device could have a plurality of connector plugs leading to a statistically valid number of samples. Electronically controlled timer devices could be used to monitor each of the many samples in any particularly desirable order. The meter means can even be provided with alarm means to signal automatically the presence or absence of significant amounts of additional moisture.

Having thus described the invention, what is claimed is:

1. A multiple sensor condition monitoring device, for use with an enclosed container, comprising:

a sealed container;

a plurality of passive sensors positioned within said sensor and adapted to measure temperature, pressure, and relative humidity within said container;

means for inductive transmission for the activation and response of the measurement sensors;

meter means connected to said sensor for operating said sensors and receiving measurements therefrom; and means for enabling the calculation of specific quantities of moisture in said container using the measurements from said sensor.

2. The device of claim 1 wherein said container is a metallic projectile.

3. The device of claim 2 wherein said sensors are connected to said meter means by insulated wire.

4. The device of claim 3 wherein said wire is detachably connected to the wall of said container.

5. The device of claim 1 wherein said container is a non-metallic projectile.

6. The device of claim 5 wherein said sensors are connecterd to said meter by induction means.

7. The device of claim 1 wherein said meter means and said means for calculation of the specific quantity of moisture in said container include gauge means for displaying measurement values for temperature, pressure and relative humidity.

8. The device of claim 7 which further includes recording means for recording measured values of temperature, pressure and relative humidity.

9. The device of claim 7 which further includes means for displaying the calculated value of moisture in said container.

10. The device of claim 8 which further includes means for recording the calculated value of moisture in said container.

11. The device of claim 6 which further includes the means to interpret the output of the sensors and transmit signals representing the values of the measurements to said meter upon request of said meter.

* * * * *